United States Patent
Cho et al.

(10) Patent No.: US 8,774,849 B2
(45) Date of Patent: Jul. 8, 2014

(54) APPARATUS FOR UPDATING INFORMATION OF AN M2M DEVICE IN A WIRELESS COMMUNICATION SYSTEM AND METHOD THEREOF

(75) Inventors: Heejeong Cho, Anyang-si (KR); Eunjong Lee, Anyang-si (KR)

(73) Assignee: LG Electronics Inc., Soul (KR)

( * ) Notice: Subject to any disclaimer, the term of this patent is extended or adjusted under 35 U.S.C. 154(b) by 330 days.

(21) Appl. No.: 13/456,998

(22) Filed: Apr. 26, 2012

(65) Prior Publication Data

US 2013/0053084 A1     Feb. 28, 2013

Related U.S. Application Data

(60) Provisional application No. 61/526,690, filed on Aug. 24, 2011, provisional application No. 61/529,932, filed on Sep. 1, 2011, provisional application No. 61/531,089, filed on Sep. 6, 2011, provisional application No. 61/532,567, filed on Sep. 9, 2011.

(51) Int. Cl.
*H04W 88/00*     (2009.01)
*H04W 4/00*     (2009.01)
*H04W 68/00*     (2009.01)

(52) U.S. Cl.
CPC .............. *H04W 68/00* (2013.01); *H04W 4/001* (2013.01); *H04W 4/005* (2013.01)
USPC .......................................... 455/515; 455/434

(58) Field of Classification Search
CPC ............................... H04W 48/16; H04W 68/00
USPC ....................................................... 455/515
See application file for complete search history.

(56) References Cited

U.S. PATENT DOCUMENTS

| | | | | |
|---|---|---|---|---|
| 5,467,360 A | * | 11/1995 | Lokhoff | 714/755 |
| 5,592,497 A | * | 1/1997 | Lokhoff | 714/755 |
| 5,604,744 A | * | 2/1997 | Andersson et al. | 370/347 |

(Continued)

FOREIGN PATENT DOCUMENTS

WO    WO 2011/099753 A2    8/2011

OTHER PUBLICATIONS

Vodafone: "Use case for C-Plane Latency Improvements", 3GPP Draft; R2-102298, 3rd Generation Partnership Project (3GPP), Mobile Competence Centre; 650, Route Des Lucioles; F-06921 Sophia-Antipolis Cedex; France, vol. RAN WG2, No. Beijing, China; 20100412, Apr. 5, 2010, XP050422462, [retrieved on Apr. 5, 2010].

*Primary Examiner* — Hai V Nguyen
(74) *Attorney, Agent, or Firm* — Mckenna Long & Aldridge LLP

(57) ABSTRACT

The present invention relates to wireless communication, and more particularly, to a method for a machine-to-machine (hereinafter abbreviated M2M) communication applied M2M device to update information in a wireless communication system and terminal thereof. In decoding superframe header subpacket information in an M2M (machine to machine) device in idle mode in a wireless communication system, the present invention includes comparing a paging cycle with a $1^{st}$ cycle and if the paging cycle is equal to or greater than the $1^{st}$ cycle, decoding the superframe header subpacket information, wherein the $1^{st}$ cycle is determined using a following formula: $I=C\times 2^n$, where the I indicates the $1^{st}$ cycle, the C is a change cycle of a secondary superframe header, and the n is a bit size of a change count of the secondary superframe header.

12 Claims, 10 Drawing Sheets

(56) References Cited

U.S. PATENT DOCUMENTS

| | | | |
|---|---|---|---|
| 6,795,425 B1 * | 9/2004 | Raith | 370/345 |
| 7,092,721 B2 * | 8/2006 | Harris et al. | 455/455 |
| 7,304,996 B1 * | 12/2007 | Swenson et al. | 370/394 |
| 7,539,750 B1 * | 5/2009 | Parker et al. | 709/224 |
| 7,613,209 B1 * | 11/2009 | Nguyen et al. | 370/474 |
| 7,821,931 B2 * | 10/2010 | Swenson et al. | 370/230 |
| 8,274,940 B2 * | 9/2012 | Ishii et al. | 370/329 |
| 8,416,746 B2 * | 4/2013 | Fong et al. | 370/332 |
| 8,488,543 B2 * | 7/2013 | Park et al. | 370/329 |
| 8,503,422 B2 * | 8/2013 | Kang et al. | 370/345 |
| 8,620,336 B2 * | 12/2013 | Golaup et al. | 455/450 |
| 8,644,864 B2 * | 2/2014 | Zeira et al. | 455/500 |
| 8,660,064 B2 * | 2/2014 | Lee et al. | 370/328 |
| 2006/0019681 A1 * | 1/2006 | Harris et al. | 455/464 |
| 2008/0049774 A1 * | 2/2008 | Swenson et al. | 370/412 |
| 2008/0084941 A1 * | 4/2008 | Mohanty et al. | 375/260 |
| 2009/0268700 A1 * | 10/2009 | Son et al. | 370/336 |
| 2009/0280848 A1 * | 11/2009 | Park et al. | 455/515 |
| 2010/0091724 A1 * | 4/2010 | Ishii et al. | 370/329 |
| 2010/0271175 A1 * | 10/2010 | Chou et al. | 340/7.25 |
| 2011/0032899 A1 * | 2/2011 | Park et al. | 370/329 |
| 2011/0051668 A1 * | 3/2011 | Lee et al. | 370/328 |
| 2011/0065467 A1 * | 3/2011 | Park et al. | 455/507 |
| 2011/0075604 A1 * | 3/2011 | Fong et al. | 370/328 |
| 2011/0163847 A1 * | 7/2011 | Park et al. | 340/7.34 |
| 2011/0195709 A1 | 8/2011 | Christensson et al. | |
| 2011/0244792 A1 * | 10/2011 | Park et al. | 455/39 |
| 2012/0178485 A1 * | 7/2012 | Zeira et al. | 455/515 |
| 2013/0039255 A1 * | 2/2013 | Kim et al. | 370/312 |
| 2013/0053084 A1 * | 2/2013 | Cho et al. | 455/515 |
| 2013/0121300 A1 * | 5/2013 | Cho et al. | 370/329 |
| 2013/0121303 A1 * | 5/2013 | Cho et al. | 370/329 |
| 2013/0136048 A1 * | 5/2013 | Cho et al. | 370/311 |
| 2013/0189978 A1 * | 7/2013 | Lee et al. | 455/434 |
| 2013/0235748 A1 * | 9/2013 | Fong et al. | 370/252 |
| 2014/0029539 A1 * | 1/2014 | Choi et al. | 370/329 |
| 2014/0031063 A1 * | 1/2014 | Park et al. | 455/456.1 |
| 2014/0092801 A1 * | 4/2014 | Kim et al. | 370/312 |
| 2014/0119201 * | 5/2014 | Kim et al. | 370/242 |

* cited by examiner (a)

(b)

APPARATUS FOR UPDATING INFORMATION OF AN M2M DEVICE IN A WIRELESS COMMUNICATION SYSTEM AND METHOD THEREOF

This application claims the benefit of earlier filing date and right of priority to Application No. 61/526,690, filed on Aug. 24, 2011, Application No. 61/529,932, filed on Sep. 1, 2011, Application No. 61/531,089, filed on Sep. 6, 2011, and Application No. 61/532,567, filed on Sep. 9, 2011, the contents of which are hereby incorporated by reference herein in their entirety.

BACKGROUND OF THE INVENTION

1. Field of the Invention

The present invention relates to wireless communication, and more particularly, to a method for a machine-to-machine (hereinafter abbreviated M2M) communication applied M2M device to update information in a wireless communication system and terminal thereof.

2. Discussion of the Related Art

Although most of the conventional communications include human-to-human (hereinafter abbreviated H2H) communications (i.e., communications between terminals used by users), the ongoing development of communication technology enables machine-to-machine (hereinafter abbreviated M2M) communications. The M2M communication literally means a communication between one electronic terminal and another electronic terminal. In a broad sense, M2M communication may mean a wire/wireless communication between electronic terminals or a communication between a human-controllable terminal and a machine. Recently, the M2M communication generally indicates a communication between electronic terminals, i.e., M2M wireless communication.

In the early 1990's, in which the concept of the M2M communication has been initially introduced, the M2M communication has been recognized as remote control or telematics and derivative markets of the M2M communication were very limitative. Yet, the M2M communication has grown rapidly for past few years and has become the globally noteworthy markets. Specifically, in POS (point of sales) and security related application markets, the M2M communication has considerable influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of M2M communication, every machine equipped with SIM (subscriber identify module) card enables data transmission and reception and is capable of remote management and control. For instance, as M2M communication technology is usable for numerous devices and equipment including vehicles, trucks, containers, auto-vending machines, gas tanks and the like, its application fields may reach far and wide.

Meanwhile, in case that a terminal has a long paging cycle, it may cause a problem that a paging reception and response for the corresponding terminal may have a long delay time.

Moreover, in case that a terminal has a long paging cycle, the terminal may have system information changed again while waiting despite acquiring latest system information in the corresponding cycle. Unless uplink data is generated, it may cause such a problem that a procedure for monitoring a presence or non-presence of a change, updating system information and awaiting a reception of a paging message may be infinitely repeated, whereby the demand for a solution of this problem is rising.

SUMMARY OF THE INVENTION

Accordingly, the present invention is directed to a method and apparatus for updating information of an M2M device in a wireless communication system that substantially obviate one or more problems due to limitations and disadvantages of the related art.

An object of the present invention is to provide a method for a machine-to-machine (hereinafter abbreviated M2M) communication applied M2M device to update information in a wireless communication system and apparatus for the same.

Technical tasks obtainable from the present invention may be non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of decoding superframe header subpacket information in an M2M (machine to machine) device in idle mode in a wireless communication system, according to one embodiment of the present invention may include the steps of comparing a paging cycle with a $1^{st}$ cycle and if the paging cycle is equal to or greater than the $1^{st}$ cycle, decoding the superframe header subpacket information, wherein the $1^{st}$ cycle is determined using a following formula: $I = C \times 2^n$, where the I indicates the $1^{st}$ cycle, the C is a change cycle of a secondary superframe header, and the n is a bit size of a change count of the secondary superframe header.

Preferably, the change cycle of the secondary superframe header may include one of 16, 32 and 64.

Preferably, the bit size of the change count of the secondary superframe header is 4.

Preferably, the method may further include the steps of sending a $1^{st}$ message to a base station to make a request for the paging cycle and receiving a $2^{nd}$ message containing the paging cycle in response to the sent $1^{st}$ message.

Preferably, the method may further include the steps of if the paging cycle is smaller than the $1^{st}$ cycle, determining whether a system information is changed and if the system information is changed, decoding the superframe header subpacket information.

More preferably, if the change cycle of the secondary superframe header is changed, the system information may be determined as changed.

In another aspect of the present invention, an M2M (machine to machine) device, which decodes superframe header subpacket information in idle mode in a wireless communication system, according to another embodiment of the present invention may include a processor comparing a paging cycle with a $1^{st}$ cycle, the processor, if the paging cycle is equal to or greater than the $1^{st}$ cycle, decoding the superframe header subpacket information, the processor controlling the $1^{st}$ cycle to be determined using a following formula: $I=C \times 2^n$, where the I indicates the $1^{st}$ cycle, the C is a change cycle of a secondary superframe header, and the n is a bit size of a change count of the secondary superframe header.

Preferably, the change cycle of the secondary superframe header may include one of 16, 32 and 64.

Preferably, the bit size of the change count of the secondary superframe header is 4.

Preferably, the M2M device may further include a transmitting module transmitting a $1^{st}$ message to a base station to make a request for the paging cycle and a receiving module receiving a $2^{nd}$ message containing the paging cycle in response to the sent $1^{st}$ message.

Preferably, if the paging cycle is smaller than the $1^{st}$ cycle, the processor may determine whether a system information is changed. More preferably, if the system information is changed, the processor may control the superframe header subpacket information to be decoded.

More preferably, if the change cycle of the secondary superframe header is changed, the processor may determine that the system information is changed.

Accordingly, the present invention provides the following effect and/or advantage.

First of all, an M2M device according to an embodiment of the present invention performs an information update in a wireless communication system quickly and efficiently, Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
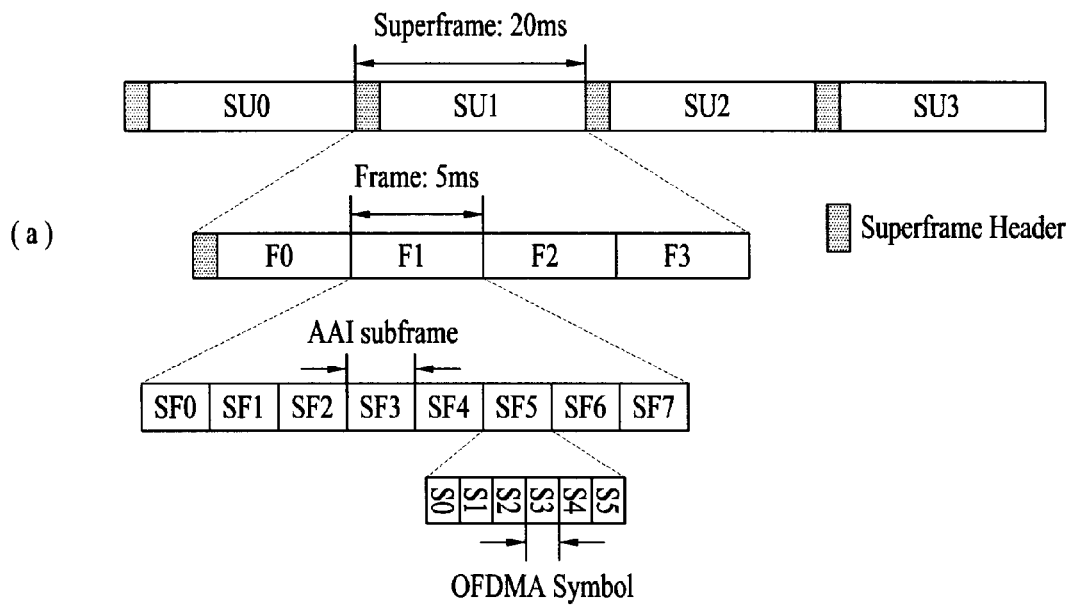
FIG. 1 is a diagram of a superframe in IEEE 802.16m system for example of a wireless communication system.
Figure 1:
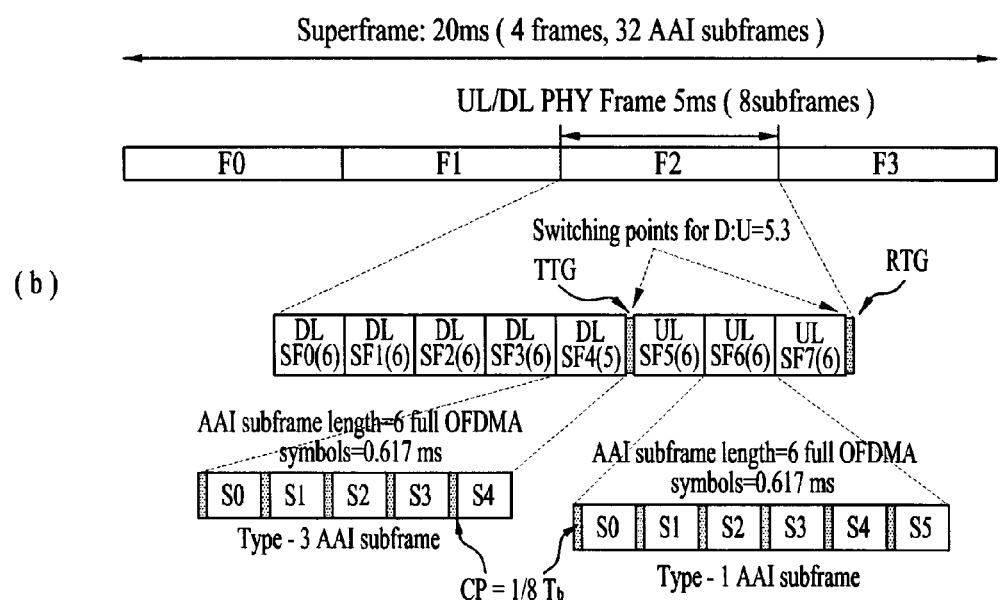

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention.

The following detailed description of the invention includes details to help the full understanding of the present invention. Yet, it is apparent to those skilled in the art that the present invention can be implemented without these details. For instance, although the detailed description of the invention is made on the assumption that a wireless communication system includes IEEE 802.16 system, it may be applicable to other random wireless communication systems (e.g., LTE/LTE-A) except unique features of IEEE 802.16.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like and that a base station is a common name of such a random node of a network stage communicating with a terminal as a Node B, an eNode B, a base station (BS), an access point (AP) and the like. In the following description, assume that a terminal or user equipment includes an advanced mobile station (AMS) that meets IEEE 802.16m specifications. And, assume that a base station includes an advanced base station (ABS) that meets the same specifications as well.

In a wireless communication system, a user equipment may be able to receive information in downlink from a base station and may be also able to transmit information in uplink. The information transmitted or received by the user equipment may include data and various kinds of control informations and various kinds of physical channels may exist in accordance with types and usages of the informations transmitted or received by the user equipment.

A user equipment performing an M2M communication may be variously named one of an M2M device, an M2M communication user equipment, an MTC (machine type communication) user equipment and the like. And, a conventional or legacy user equipment may be named an HTC (human type communication) user equipment or an H2H (human to human) user equipment.

The number of M2M devices will increasingly grow in a uniform network as the number of machine application types does. The currently discussed user equipment application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types. Thus, as the machine application types are diversified, the number of the M2M devices can increase more rapidly than that of conventional user equipments, i.e., H2H user equipments.

As mentioned in the above description, the numerous M2M devices within the same base station may cause such a problem as congestion of connection with conventional user equipments (e.g., H2H user equipments), access collision between M2M devices and the like. Therefore, it may be necessary to discuss how to efficiently distribute the limited resources to a multitude of newly appearing M2M devices by minimizing the influences on the conventional user equipment (e.g., H2H user equipment).

In particular, in a wireless communication system, if a procedure for a network reentry from an idle mode applied to a conventional user equipment (e.g., H2H user equipment) is exactly applied to a multitude of M2M devices, it may cause such a problem as congestion in connections between conventional H2H user equipments and M2M devices due to the M2M device property and the like. Hence, it may be necessary to modify the network reentry procedure in part at least.

FIG. 1 is a diagram of a superframe in IEEE 802.16m system for example of a wireless communication system.

Referring to FIG. 1, a superframe has a length of 20 ms and consists of 4 frames. Each of the frames may consist of 8 subframes. In case of TDD, 8 subframes may be divided into a downlink (DL) subframe region and an uplink (UL) subframe region, each of which includes a prescribed number of subframes at a downlink (DL) to uplink (UL) ratio. In particular, referring to FIG. 1 (b), if the UL to DL ratio is 5:3, 5 of the 8 subframes are assigned to DL subframes SF0 to SF4 and the rest of the 8 subframes (i.e., 3 subframes) are assigned to UL subframes SF5 to SF7.

An idle time (i.e., TTG (transmit/receive transition gap), to which data symbol (i.e., idle symbol) containing data is not assigned, exists between the DL subframe region and the UL subframe region. And, another idle time (i.e., RTG (receive/transmit transition gap) may exist behind the DL subframe region as well. Moreover, one subframe may consist of 6 OFDM symbols.

Using the above-described frame structure, a base station and a user equipment may perform a data exchange in-between. For instance, the user equipment may receive data from the base station via DL subframe or transmit data to the base station via UL subframe. The base station may transmit data to the user equipment via DL subframe or receive data from the user equipment via UL subframe.

In the above-mentioned frame structure, a superframe header (SFH) may be transmitted to the user equipment via the superframe. In the superframe header, resource allocation information, system information by the unit of frame or subframe included in the superframe header and the like may be contained in the superframe header. The superframe header (SFH) may be situated at a $1^{st}$ subframe in the superframe and may use 5 OFDM symbols in the subframe.

The SFH may be divided into a primary superframe header (P-SFH) and a secondary superframe header (S-SFH).

The P-SFH is transmitted in each superframe cycle and may contain system information supposed to be transmitted in each superframe. And, the P-SFH may contain S-SFH change count, S-SFH scheduling information, S-SFH change bitmap, S-SFH application hold indicator and the like.

The S-SFH change count may indicate whether a value of each field in S-SFH SP IE is changed (or updated). In particular, if a value of a prescribed field in the S-SFH SP IE is changed, S-SFH change count is incremented (e.g., 1 modulo 16) to start with a next S-SFH change cycle. This incremented S-SFH change count is maintained until another next S-SFH change cycle. If a value of the S-SFH change count field of a next P-SFH IE is equal to a value saved in a user equipment, the user equipment determines that there is no change in the S-SFH IE and then ignores S-SFH IEs.

In doing so, the applicable S-SFH change cycle may be set as Table 1.

TABLE 1

| Syntax | Size (bit) | Notes |
|---|---|---|
| S-SFH SP3 IE format ( ) { | | |
| S-SFH change cycle | 3 | It is the minimum duration (unit: superframe) over which the contents of the S-SFH remain the same.<br>0b000: 16<br>0b001: 32<br>0b010: 64<br>0b011~0b111: reserved |

The S-SFH change bitmap may indicate what kind of S-SFH SP IE has been changed. Bits of the S-SFH change bitmap indicate S-SFH SP1 IE, S-SFH SP2 IE, S-SFH SP3 IE, respectively. In this case, the changed S-SFH SP IE may be represented as '1'. Otherwise, it may be represented as '0'. For instance, if S-SFH SP3 IE is changed, the S-SFH SP change bitmap may be represented as '100'.

The S-SFH application hold indicator may indicate a timing point to which the explicitly changed SFH SP IE will be applied. If a value of a field is set to 0, S-SFH SP IE associated with a current S-SFH change count may be used. If the value of the field is set to 1, S-SFH SP IE associated with a previous S-SFH change count may be used.

S-SFH IE 9 secondary super frame header information element) contains information related to network entry/reentry and the like and may be divided into three kinds of subpackets (SPs). These subpackets may be transmittable by different periods. And, information related to this periodicity may be contained as SP scheduling periodicity information in S-SFH SP3. The S-SFH SP1 IE may contain information for network reentry, the S-SFH SP2 IE may contain information for initial network entry) and network discovery, and the S-SFH SP3 IE may contain the rest of necessary system information for the network entry (or reentry).

Figure 2:
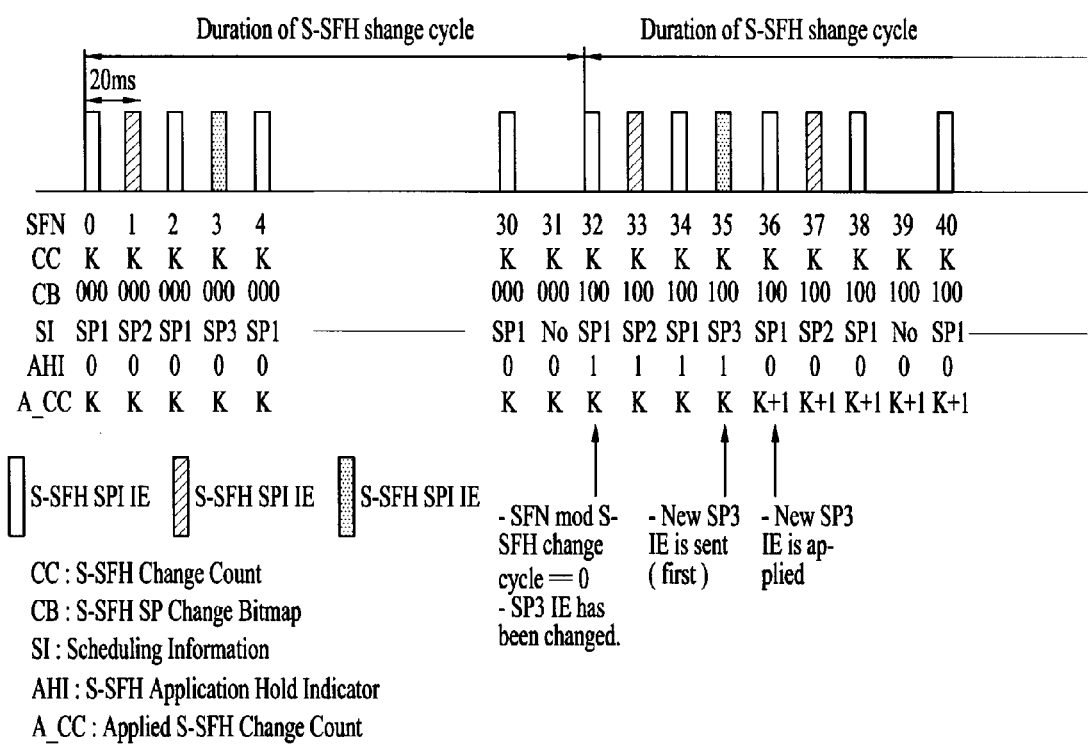
FIG. 2 is a diagram to illustrate an update of S-SFH IE in IEEE 802.16m system for example of a wireless communication system.

FIG. 2 is a diagram to illustrate an update of S-SFH IE in IEEE 802.16m system for example of a wireless communication system. In particular, FIG. 2 shows a case that information contained in S-SFH SP3 IE is changed.

Referring to FIG. 2, it may be observed that an S-SFH change cycle is assumed as 32 and that a specific S-SFH SP IE is transmitted at each super frame number (SFN). For instance, if a base station determines that information on a network reentry, which is contained in S-SFH SP3 IE of SFN 30, needs to be changed, a CC (S-SFH change count) is incremented by 1 from SFN 32 with which a next S-SFH change cycle starts. And, a CB (S-SFH change bitmap) is also changed into 100 from 000 to indicate that the changed S-SFH IE is the S-SFH SP3 IE. Moreover, the base station starts to transmit the changed S-SFH SP3 IE.

A user equipment checks an S-SFH change count field by receiving P-SFH IE. In particular, the user equipment is aware that the CC (S-SFH change count) in SFN 32 has been incremented by 1 from 'K' saved in the user equipment, and more particularly, that the S-SFH SP IE has been changed. The user equipment is aware that the changed S-SFH SP3 IE has been changed from the CB (S-SFH change bitmap) and then waits for the S-SFH SP3 IE. The user equipment initially receives the S-SFH SP3 IE changed in SFN 35, decodes the received S-SFH SP3 IE, and is then able to use the changed network reentry information from SFN 36. If a changed S-SFH IE is S-SFH SP1 IE or S-SFH SP2 IE, the changed content may be applicable to a changed S-SFH IE that is transmitted secondly.

Thus, through S-SFH change count, S-SFH SP change bitmap, S-SFH application hold indicator and the like, the base station is aware that which S-SFH SP IE of a current superframe should be decoded to update a system parameter contained in S-SFH SP IE.

Meanwhile, AAI-SCD message is provided by a base station to transmit information related to system setup and is transmitted periodically. If a content of the AAI-SCD message is changed, a value of a configuration change count field is incremented (by 1 modulo 16).

The base station uses an SCD count field of S-SFH SP3 IE to indicate a time at which the changed AAI-SCD message will be applied. The base station transmits the S-SFH SP3 IE containing an SCD count equal to the configuration change count in the AAI-SCD and then applies the changed system setup.

Meanwhile, a user equipment receives the system setup information of the AAI-SCD message related to the current SCD count. If the change of the AAI-SCD message is attributed to an update of the S-SFH SP3 IE, a new AAI-SCD message is sent before the changed S-SFH SP. Having received the changed S-SFH SP3, the user equipment may be able to use the system setup of the AAI-SCD message associated with the current SCD count.

Figure 3:
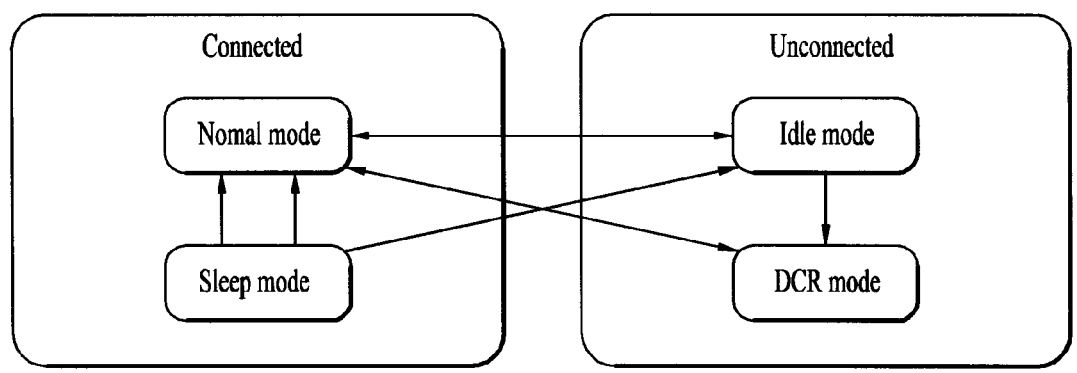
FIG. 3 is a diagram of a state of a user equipment in IEEE 802.16m system for example of a wireless communication system.

FIG. 3 is a diagram of a state of a user equipment in IEEE 802.16m system for example of a wireless communication system.

Referring to FIG. 3, a state of a user equipment may be mainly classified into a connected state and an unconnected state. The connected state may be divided into a normal mode and a sleep mode. And, the unconnected state may be divided into an idle mode and a DCR (deregistration with content retention) mode. In particular, both of the sleep mode and the idle mode are defined to efficiently control power consumption of the user equipment.

First of all, the sleep mode is the mode of operating and managing a sleep mode pattern including a sleep-window and a listening-window granted by the base station through AAI-SLP-REQ/AAI-SLP-RSP message exchange between the user equipment and the base station. The idle mode is the mode of operating and managing a paging group, a paging cycle and a paging offset granted by the base station through AAI-DREG-REQ/AAI-DREG-CMD message exchange between the user equipment and the base station to save power and radio resources of the user equipment.

Secondly, the normal mode is the mode in which the user equipment performs a service provided by a corresponding system using a radio resource. The DCR (deregistration with content retention) mode is the mode in which a content is retained for prescribed duration despite deregistration of the user equipment from a network.

Basic operations of the sleep mode are described as follows. First of all, in case that UL or DL traffic is not generated in normal mode for prescribed duration, a user equipment sends AAI-SLP-REQ message to a base station to make a request for a transition to a sleep mode. If the request for the operation in sleep mode is received via the AAI-SLP-REQ message, the base station makes a final grant on the request by sending AAI-SLP-RSP message to the user equipment. Having received the AAI-SLP-RSP message, the user equipment receives an assignment of ID (SLPID) to identify a user equipment operating in sleep mode and then operates the sleep mode.

In doing so, major parameters obtained from the message exchanges between the user equipment and the base station include an initial sleep-window for specifying a size of an initial sleep window interval, a final sleep-window base for specifying a size of a final sleep window interval, a final sleep-window exponent, and a listening-window for specifying a size of a listening-window interval, where a unit of each of the parameters is set to a frame. The sleep window is in interval in which a user equipment operating in sleep mode minimizes its power. And, the user equipment does not receive DL control information and DL traffic during the sleep-window interval. The listening window is an interval in which a user equipment operating in sleep mode gets away from the sleep window, receives AAI-TRF-IND message sent by a base station, and then determines a presence or non-presence of DL traffic transmitted to itself. And, the user equipment may be able to receive DL control information and DL traffic in the sleep-window interval.

Basic operations of the idle mode are described as follows. First of all, if UL or DL traffic is not generated for prescribed duration in normal mode, a user equipment sends AAI-DREG-REQ message to a base station to make a request for a transition to the idle mode, receives AAI-DREG-CMD message from the base station, and then operates the idle mode. In the AAI-DREG-REQ message, a paging cycle requested by the user equipment is defined. In the AAI-DREG-CMD message sent by the base station having received the AAI-DREG-REQ message, a paging group ID, a paging offset and a paging cycle are defined. The user equipment sets a paging unavailable interval and a paging listening interval according to the parameters.

In the following description, in order to save power of a user equipment, an idle mode may indicate a mode of operating and managing a paging group, paging cycle and paging offset granted by a base station through signaling between the user equipment and the base station. In particular, even if a user equipment is roaming around a radio link environment having a plurality of base stations located across a wide area, the idle mode enables the user equipment to periodically receive a DL broadcast message without registration with a specific base station.

In the idle mode, all normal operations are stopped as well as a handover (HO) and a DL synchronization is matched to receive a paging message (i.e., a broadcast message) in a predetermined interval only. In this case, the paging message is a message to instruct a user equipment of a paging action. In this case, the paging action may include such an action as a ranging execution, a network reentry and the like.

An idle mode may be initiated by a user equipment or a base station. In particular, the user equipment sends a deregistration request (DREG-REQ) message to a base station, receives a deregistration response (DREG-RSP) message from the base station in response to the DREG-REQ message, and may be then able to enter the idle mode. Alternatively, if the base station sends a non-requested deregistration response (DREG-RSP) message or a deregistration command (DREG-CMD) message to the user equipment, the user equipment may be able to enter the idle mode.

In case that a user equipment receives a paging message corresponding to the user equipment itself in an available interval (AI), the user equipment switches the idle mode to a connected mode through a network entry procedure with a base station and then transmits and receives data.

In general, an idle state or mode operation may mean the operation of supporting a user equipment to perform DL traffic transmission periodically without registration with a specific base station when the user equipment roams around a radio link environment including multiple base stations. If a user equipment does not receive traffic from a base station for predetermined duration, the user equipment may enter an idle state to save power. Having entered the idle mode, the user equipment receives a broadcast message (e.g., a paging message) broadcasted by the base station in an available interval (AI) and may be then able to determine whether to make a transition to a normal mode or remain in the idle state.

An idle state may give a benefit to a user equipment by eliminating activation requirements related to handover and general operation requirements. The idle state restricts user equipment activity to be scanned in a discrete period, thereby enabling the user equipment to save its power and operating resources. The idle state provides a user equipment with a simple and appropriate scheme of indicating DL traffic in pending and give benefits to a network and a base station by removing a radio interface and network handover (HO) traffic from a deactivated user equipment.

Paging means a function of acquiring a location (e.g., a specific base station, a specific communication exchange, etc.) of a corresponding user equipment in case of an incoming signal occurrence in mobile communication. A plurality of idle state or mode supporting base stations may be able to configure a paging area by belonging to a specific paging group. In this case, the paging group means a logical group. The object of the paging group is to provide an adjacent raging area, which can be paged in DL if there is a traffic that targets a user equipment. Preferably, the paging group is configured large enough to have a specific user equipment exist in the same paging group during most of time and also configured small enough for a paging load to be maintained at a proper level.

A paging group may include at least one or more base stations. And, each of the base stations may belong to one or more paging groups. The paging group is defined by a management system. In the paging group, a paging group-action backbone network message is usable. A paging controller manages a list of user equipments in idle state using a paging-announce message as one of backbone network messages and also manages initial paging of all base stations belonging to the paging group.

Paging in idle mode may be explained with reference to IEEE 802.16 system for clarity of the description, by which the technical idea of the present invention may be non-limited. In order to enter an idle mode, a user equipment sends a deregistration request (DREG-REQ) message to a base station to make a request for a deregistration with the base station. In response to the DREG-REQ message, the base station then sends a deregistration response (DREG-RSP) message to the user equipment. In this case, the DREG-RSP message may contain paging information. In doing so, the entry into the idle mode by the user equipment may be initiated by a request made by the base station. If so, the base station sends a DREG-RSP message to the user equipment.

The paging information may include values of a paging cycle, a paging offset, a paging group identifier (PGID), a paging listening interval and the like.

In particular, the paging cycle may have the values shown in Table 2.

TABLE 2

| Field | Size (bits) | Value/Description | Condition |
|---|---|---|---|
| Paging cycle | 4 | Used to indicate Paging cycle for the AMS<br>0x00: 4 superframes<br>0x01: 8 superframes<br>0x02: 16 superframes<br>0x03: 32 superframes<br>0x04: 64 superframes<br>0x05: 128 superframes<br>0x06: 256 superframes<br>0x07: 512 superframes<br>0x08: 32768 superframes<br>0x09: 262144 superframes<br>0x10: 4194304 superframes<br>0x11-0x15: reserved | Values 0x08-0x10 may be applied to M2M devices only. |

In order to raise reliability of paging message reception for a user equipment having a long paging cycle, a pair of paging offsets may be assigned to the user equipment.

A pair of the paging offsets may be represented as Table 3.

TABLE 3

| Paging offset | 12 | Used to indicate Paging offset for the AMS. Determines the superframe within the paging cycle from which the paging listening interval starts. Shall be smaller than Paging cycle value. | |
|---|---|---|---|
| M2M paging offset | 10 | Used to indicate the superframe within the paging cycle at which the M2M device's paging listening interval starts. The superframe is determined by concatenating the M2M paging offset field and the Paging offset field. M2M paging offset shall be interpreted as the MSB. Shall be smaller than Paging cycle value. | May be present when the Paging cycle value is set to 0x08, 0x09, or 0x10 |

Referring to Table 3, if a user equipment is unable to receive AAI-PAG-ADV message in a $1^{st}$ paging offset, the user equipment may have to monitor whether the AAI-PAG-ADV message is transmitted in a $2^{nd}$ paging offset.

For the period of the $1^{st}$ paging offset, the AAI-PAG-ADV message is sent in a network reentry step. If a base station fails to receive a corresponding response from a base station, the base station may make a request for a re-page to the user equipment in the $2^{nd}$ paging offset to indicate AAI-DREG-RSP message.

Having received DREG-RSP message from the base station, the user equipment enters an idle mode with reference to the paging information. In this case, the idle mode may have a paging cycle and may be constructed with an available interval and an unavailable interval. In this case, the available interval has the same concept of a paging listening interval or a paging interval. A paging offset is used to indicates a timing point (e.g., frame, subframe, etc.) at which a paging interval starts in a paging cycle. A paging group identifier indicates an identifier of a paging group assigned to a user equipment. And, the paging information may include paging message offset information. In this case, the paging message offset information may indicate a timing point at which a paging message is sent from a base station. Subsequently, the user equipment is able to receive a paging message delivered to itself in the available interval (or the paging listening interval) using the paging information. In doing so, the paging message may be transmitted via the base station or a paging controller. In particular, the user equipment monitors a radio channel in accordance with a paging cycle to receive the paging message.

A user equipment in idle mode receives a paging message in its paging listening interval and then checks whether there is DL data delivered to the corresponding user equipment. If there is the DL data [i.e., a positive indication], the user equipment performs a network reentry process including a ranging procedure. Thereafter, the user equipment performs a process for establishing a connection for a related DA service flow through DSA (dynamic service addition) process. After the connection for the service flow has been established, a base station transmits DL data of a corresponding service to the user equipment.

For clarity and convenience of the following description, IEEE 802.16e/16m/16p system is taken as an example, by which the technical idea of the present invention may be non-limited.

In order to enter an idle mode, a user equipment sends a deregistration request (DREG-REQ) message to a base station to make a request for a deregistration with the base station. In response to the DREG-REQ message, the base station then sends a deregistration response 9DREG-RSP) message to the user equipment. In this case, the DREG-RSP message contains paging information. Hence, an entry into the idle mode may be initiated by a request made by the base station. In doing so, the base station sends a DREG-RSP message to the user equipment.

The paging information may include values of a paging cycle, a paging offset, a paging group identifier (PGID), a paging listening interval and the like. Having received the DREG-RSP message from the base station, the user equipment enters an idle mode with reference to the paging information.

An idle mode may have a paging cycle and may be constructed with an available interval and an unavailable interval. In this case, the available interval has the same concept of a paging listening interval or a paging interval. A paging offset is used to indicates a timing point (e.g., frame, subframe, etc.) at which a paging interval starts in a paging cycle. A paging group identifier indicates an identifier of a paging group assigned to a user equipment. And, the paging information may include paging message offset information. In this case, the paging message offset information may indicate a timing point at which a paging message is sent from a base station.

Thereafter, the user equipment may able to receive a paging message delivered to itself in the available interval (or the paging listening interval) using the paging information. In doing so, the paging message may be transmitted via the base station or a paging controller. In particular, the user equipment monitors a radio channel in accordance with a paging cycle to receive the paging message.

Figure 4:
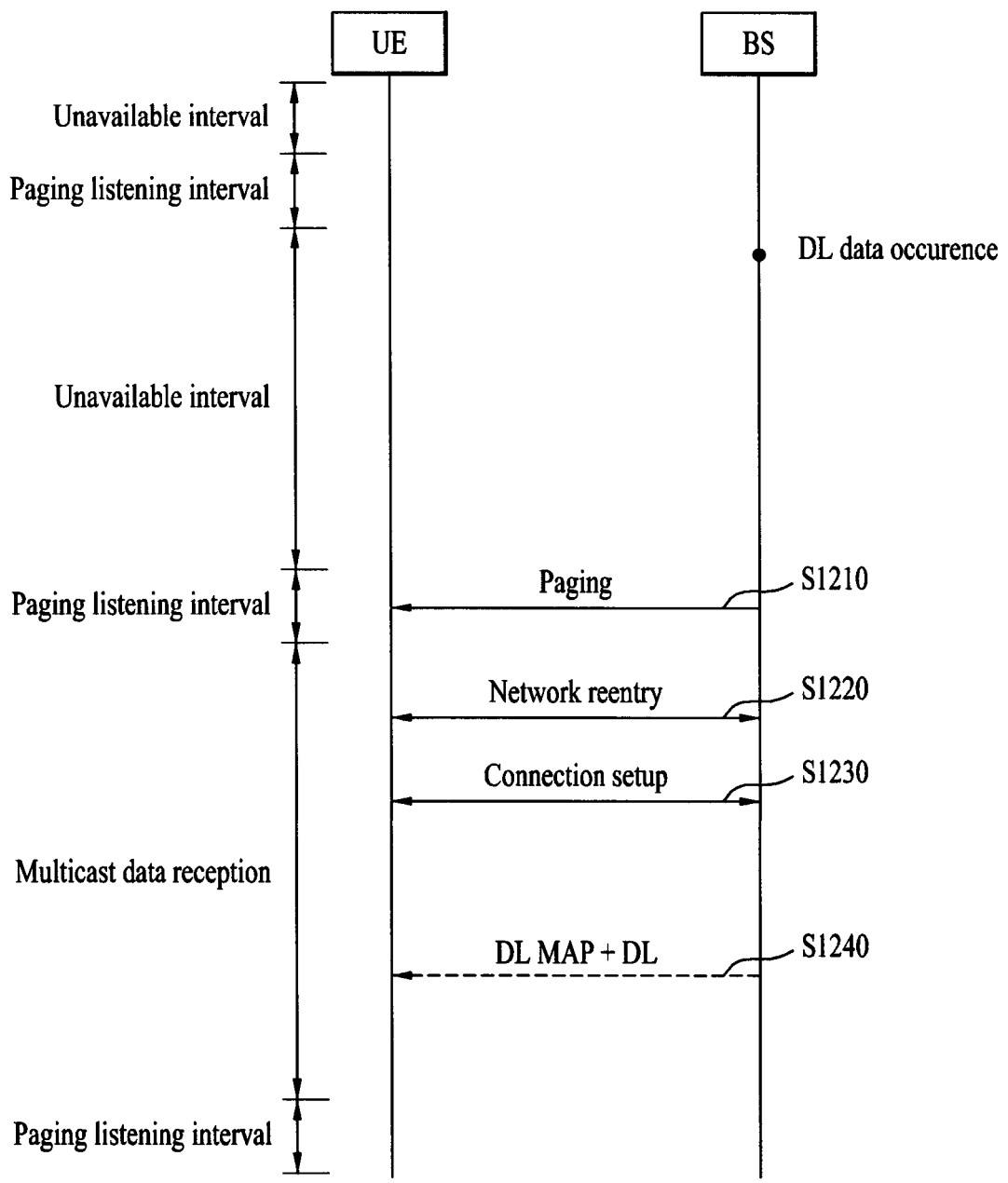
FIG. 4 is a flowchart to illustrate a paging procedure in idle mode according to the present invention.

FIG. 4 is a flowchart to illustrate a paging procedure in idle mode according to the present invention.

Referring to FIG. 4, a user equipment in idle mode receives a paging message in its paging listening interval and then checks whether there is DL data delivered to the corresponding user equipment [S1210]. If there is the DL data [i.e., a positive indication], the user equipment performs a network reentry process including a ranging procedure [S1220]. Thereafter, the user equipment performs a process for establishing a connection for a related DA service flow through DSA (dynamic service addition) process [S1230]. After the connection for the service flow has been established or set up, a base station transmits DL control information and data for a corresponding service to the user equipment [S1240].

In M2M scenarios, most of M2M devices are handheld user equipments including mobile phones and the like, an automatic application or firmware update process may become an important application in M2M service scenarios. For instance, in order update firmware of each device, M2M server may be able to transmit updated information to every M2M device having the corresponding application installed therein. In order to transmit this multicast data, which is necessary to be transmitted in common to a plurality of user equipments, to M2M devices in idle mode, the base station of the embodiment shown in FIG. 4 will page the corresponding M2M devices. Subsequently, each of the paged user equipments accesses a network by performing a network reentry process in a manner of initiating a transmission of random access code and may then receive DL traffic transmitted from the base station.

A user equipment minimizes power in a paging unavailable interval and receives AAI-PAG-ADV message sent from a base station in a paging listening interval. In this case, the AAI-PAG-ADV message includes an ID of a paging group having the message sending base station belong thereto, MAC address Hash information indicating location-update or network-entry/reentry required user equipments among a plurality of user equipments operating in idle mode, and an action code having the description of a procedure mandatory for each user equipment.

If traffic to a user equipment operating in idle mode occurs, a base station sends AAI-PAG-ADV message to the user equipment in a next paging listening interval. Having received the AAI-PAG-ADV message, the corresponding user equipment gets away from the idle mode and then enters a normal mode.

Meanwhile, when such a procedure from an idle mode as a network reentry, a network entry and the like is performed, a process for a user equipment to adjust transmission parameters (e.g., frequency offset, time offset, transmission power, etc.) for an UL communication with a base station is called a ranging.

The ranging may have 4 kinds of modes including an initial ranging, a handover ranging, a periodic ranging and a bandwidth request ranging.

The initial ranging means a process for a user equipment to adjust transmission parameters (e.g., frequency offset, time offset, transmission power, etc.) for an UL communication with a base station in the course of performing an initial network entry procedure. The handover ranging means a process for a user equipment to simplify a procedure of handover operation. The periodic ranging means a process for a user equipment to persistently maintain a UL communication with a base station after completion of a network entry procedure. The bandwidth request ranging means a process performed in the course of requesting a UL band in case of occurrence of traffic to be transmitted to a base station.

In a wireless communication system, a ranging code (or a ranging preamble) usable according to a ranging type in performing a ranging and a region (i.e., a ranging channel) for carrying the ranging code are assigned via a channel for broadcasting system information (Broadcast Assignment A-MAP IE) by a network. For instance, in order to perform a handover ranging, a user equipment selects a specific ranging code from a plurality of ranging codes for the handover ranging and then transmits the selected ranging code to a network on a handover ranging channel. The network is then able to identify a type of the ranging through the received ranging code and the ranging code carried channel.

In IEEE 802.16m system, ranging channels may be classified into a synchronized ranging channel (S-RCH) for a ranging performed by a synchronized user equipment and a non-synchronized ranging channel (NS-RCH) for a ranging performed by a non-synchronized user equipment. Moreover, in IEEE 802.16m system, when data to be transmitted by a user equipment occurs, a bandwidth request channel exists to make a request for a UL band. The ranging channels (S-RCH, NS-RCH) and the bandwidth request channel (BRCH) are used by a medium access control layer (MAC layer) for the concept of a ranging opportunity and the concept of a bandwidth request opportunity, respectively.

Meanwhile, a scheme of transmitting assignment information on a ranging code and a ranging channel and the corresponding ranging channel are discriminated in accordance with a type of a base station.

For instance, in case of a base station supporting Wireless-MAN-OFDMA with FDM-based UL PUSC Zone or such a base station having a narrow coverage as a femto cell, since synchronization between a user equipment and a base station is hardly mismatched, when an initial ranging, a handover ranging or a periodic ranging is performed, S-RCH is used.

The assignment information on a ranging code and a ranging channel is basically carried on a Superframe Header SFH (SP1: Ranging Parameter (RP) code partition information for the S-RCH, allocation periodicity of the S-RCH, subframe offset of the S-RCH, etc.).

Except the above-mentioned base stations, a base station (e.g., a macro, a relay, a macro hot-zone, etc.) uses NS-RCH in performing an initial ranging or a handover ranging. In a periodic ranging, since a user equipment is already synchronized, S-RCH is used.

The assignment information on a ranging code and a ranging channel is basically carried on Superframe Header SFH (SP1: RP code partition information for the NS-RCH, allocation periodicity of the NS-RCH, subframe offset of the NS-RCH, etc.). Ranging channel assignment information may be additionally delivered via A-MAP or AAI-SCD message as well as SFH. In case of the A-MAP, the assignment information on the NS-RCH for the handover ranging may be transmitted on Broadcast Assignment A-MAP IE or AAI-HO-CMD in a subframe except a subframe used for assignment of random normal broadcast data in accordance with a scheduling determination made by a base station. Moreover, in case of using the AAI-SCD message, such information as S-RCH assignment cycle, the number of ranging codes for a periodic ranging and the like is contained in the corresponding message.

Figure 5:
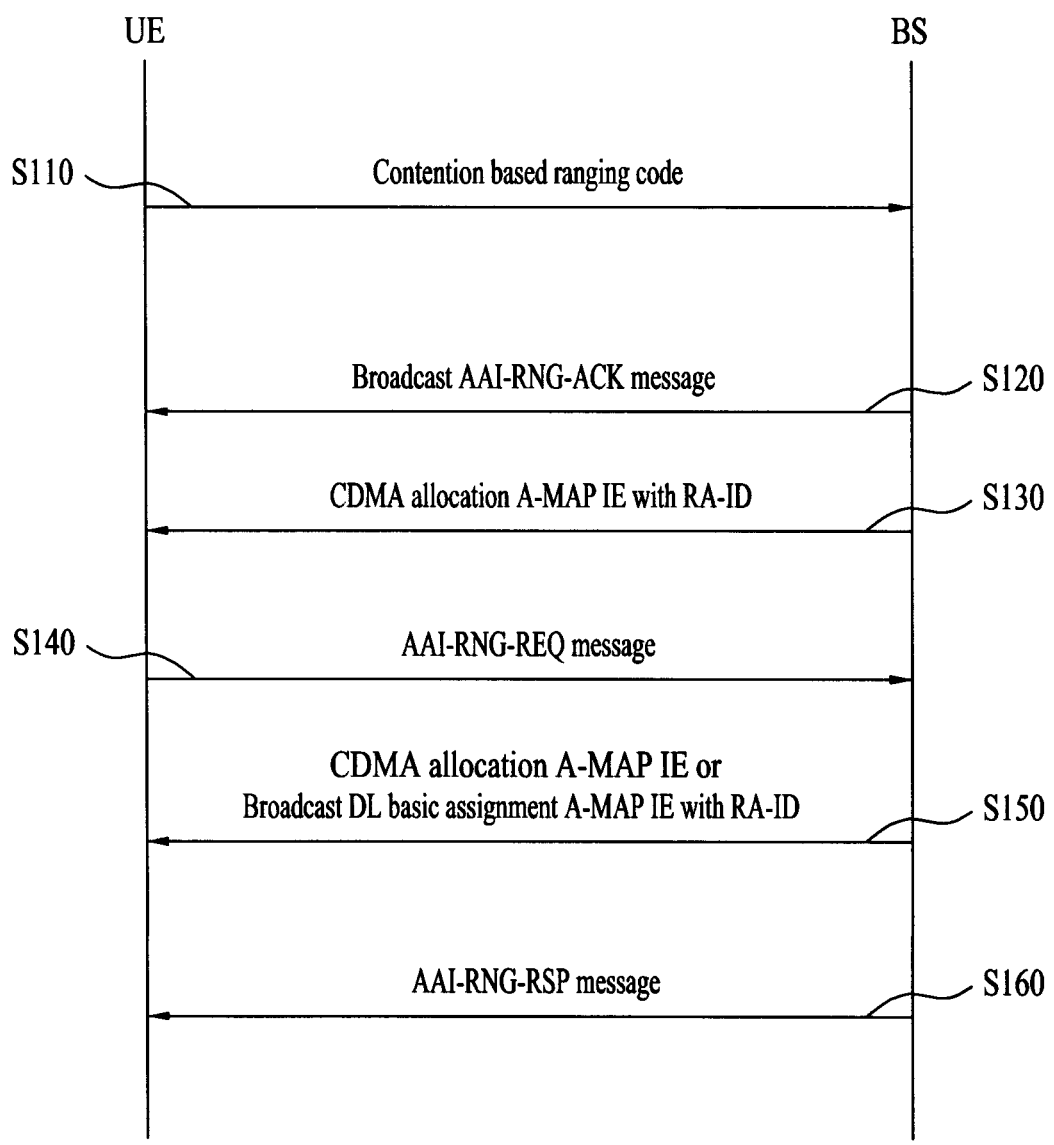
FIG. 5 is a flowchart to illustrate a process for a user equipment to perform a contention based network reentry in IEEE 802.16m system for example of a wireless communication system.

FIG. 5 is a flowchart to illustrate a process for a user equipment to perform a contention based network reentry in IEEE 802.16m system for example of a wireless communication system.

Referring to FIG. 5, a user equipment selects a ranging channel, selects a contention based ranging code, and then transmits the contention based ranging code to a base station via the selected ranging channel [S110]. If the base station successfully receives the corresponding ranging code, the base station transmits an AAI-RNG-ACK message to the user equipment by broadcast [S120]. In this case, the AAI-RNG-ACK message is the message that provides a response indicating that the ranging codes have been successfully received and detected from the ranging channel. And, the base station masks CDMA allocation A-MAP IE, which is UL resource allocation information for enabling the user equipment to send an AAI-RNG-REQ message, with a random access identifier (RA-ID) and then transmits the masked CDMA allocation A-MAP IE [S130]. Via the allocated UL resource, the user equipment sends the AAI-RNG-REQ message to the base station [S140]. The base station then transmits UL resource allocation information, via which an AAI-RNG-RSP message will be sent, to the user equipment [S150]. In doing so, the DL resource allocation information may be transmitted to the user equipment via RA-ID masked CDMA allocation A-MAP IE or broadcast DL basic assignment A-MAP IE. Thereafter, the user equipment may be able to receive the AAI-RNG-RSP message via the corresponding DL resource [S160].

Figure 6:
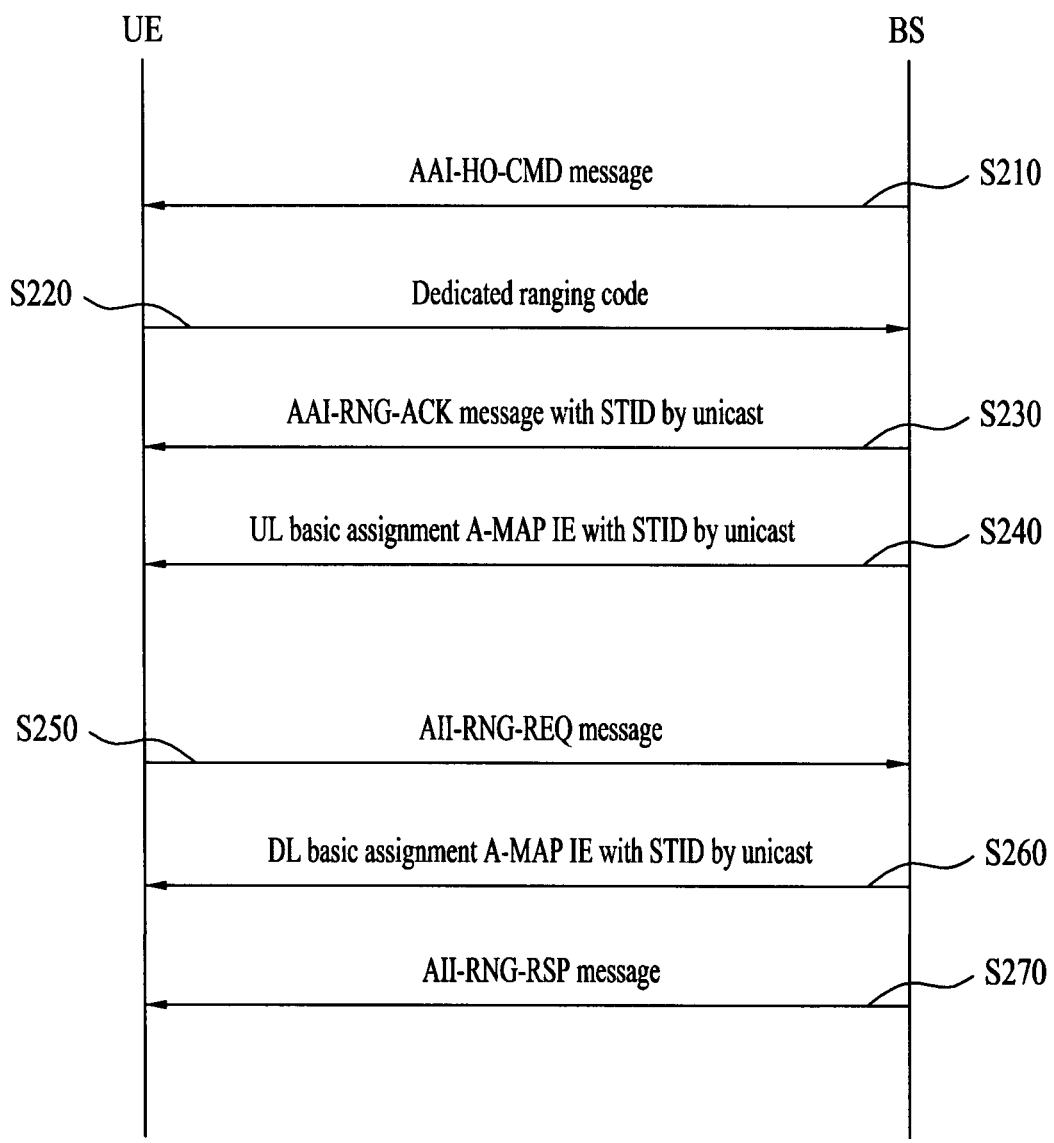
FIG. 6 is a flowchart to illustrate a process for a user equipment to perform a non-contention based network reentry in IEEE 802.16m system for example of a wireless communication system.

FIG. 6 is a flowchart to illustrate a process for a user equipment to perform a non-contention based network reentry in IEEE 802.16m system for example of a wireless communication system, which takes a non-contention based handover ranging as an example.

Referring to FIG. 6, a serving base station transmits a dedicated ranging code to a user equipment via AAI-HO-CMD message [S210]. The user equipment transmits the assigned dedicated ranging code to a target base station [S220]. The target base station informs the user equipment that the corresponding dedicated ranging code has been successfully received, by unicast via a station identifier (STID) based AAI-RNG-ACK message [S230]. Having received the dedicated ranging code, the target base station is already aware which user equipment has transmitted the corresponding dedicated ranging code. In the AAI-HO-CMD message, a station identifier (STID) previously assigned to the user equipment by the target base station is contained as well as the dedicated ranging code. In this case, since the corresponding user equipment is already acquired the STID, the AAI-RNG-ACK message may not be sent on the basis of RA-ID. The target base station transmits UL resource allocation information, which enables the user equipment to send an AAI-RNG-REQ message, to the user equipment by unicast via STID based UL basic assignment A-MAP IE [S240]. The user equipment sends AAI-RNG-REQ message to the target base station via the allocated UL resource [S250]. The base station then transmits DL resource allocation information, via which an AAI-RNG-RSP message will be sent, via STID based DL basic assignment A-MAP IE [S260]. Thereafter, the user equipment may be able to receive the AAI-RNG-RSP message via the allocated DL resource [S270].

Meanwhile, as mentioned in the foregoing description, in case of a ranging for a non-contention based network reentry, a base station sends an AAI-HO-CMD message to a user equipment in a manner that a dedicated ranging code and an STID previously assigned to the user equipment by the base station are contained in the AAI-HO-CMD message. Yet, in case that an M2M device performs a non-contention based ranging for a non-contention based network reentry, since the M2M device performs a ranging procedure based on a random access identifier (RA-ID), it may cause a problem that this RA-ID based ranging procedure has difficult in being discriminated from other RA-ID based ranging procedures.

RA-ID is schematically described as follows. First of all, RA-ID is defined with total 15 bits in accordance with a random access property of a corresponding user equipment. In particular, the RA-ID is constructed with 5-bit superframe number, 2-bit frame_index, 6-bit preamble code index for ranging and 2-bit opportunity index for ranging. In particular, the 6-bit preamble code index indicates a ranging code and the 2-bit opportunity index indicates a ranging channel for transmitting the ranging code. In more particular, the opportunity index includes '0b00' indicating a non-synchronized ranging channel (NS-RCH), '0b11' indicating a synchronized ranging channel (S-RCH), and '0b01/0b10' indicating a dynamic ranging channel. Namely, the 6-bit ranging code and the 2-bit ranging channel for carrying the ranging code are manor components for determining the RA-ID.

Figure 7:
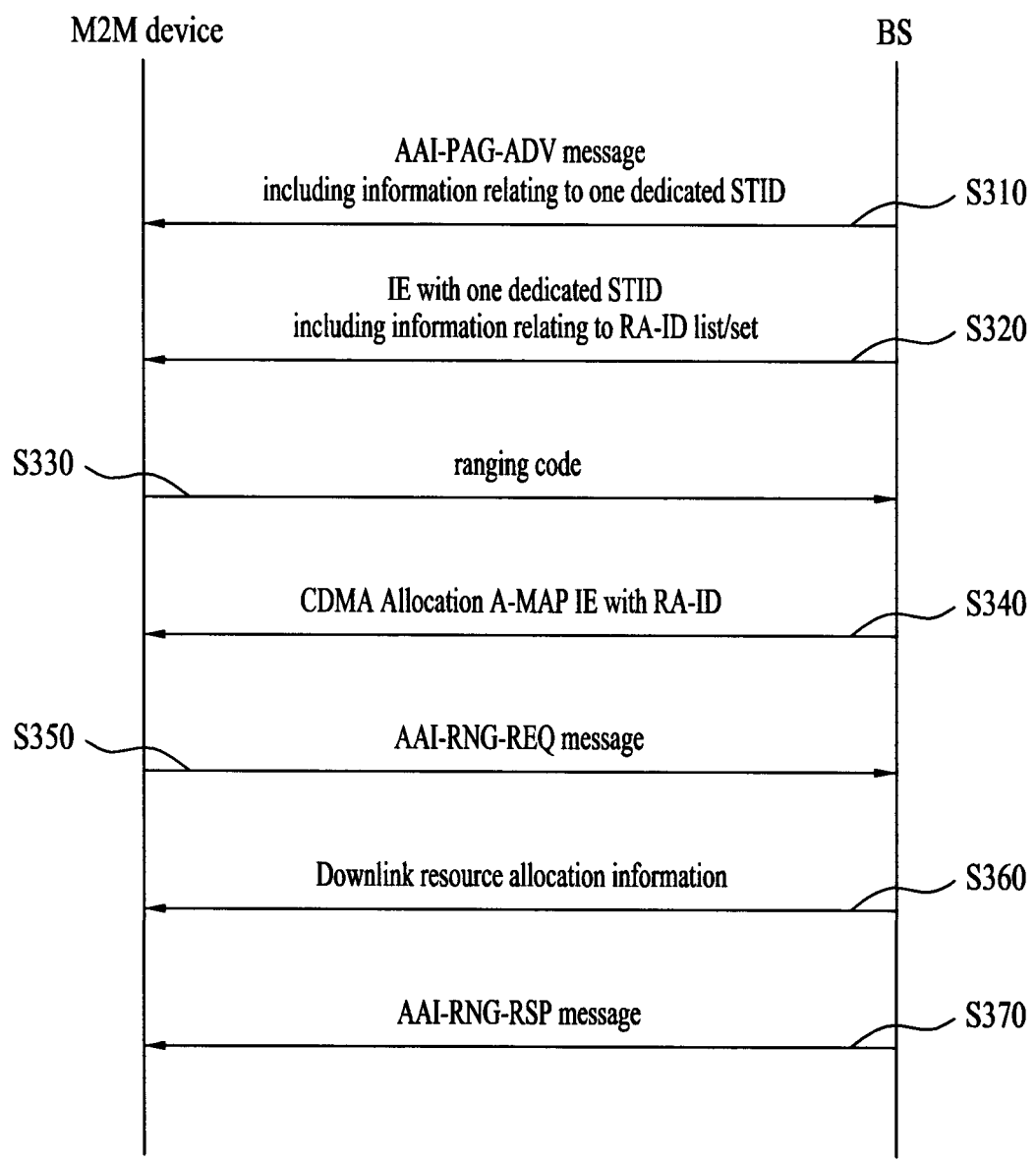
FIG. 7 is a flowchart to illustrate a process for an M2M device to perform a non-contention based network reentry according to one embodiment of the present invention.

FIG. 7 is a flowchart to illustrate a process for an M2M device to perform a non-contention based network reentry according to one embodiment of the present invention.

Referring to FIG. 7, a base station may be able to set up one dedicated identifier (e.g., one dedicated STID). One dedicated STID set up by the base station is the ID that can be used by an M2M device performing a non-contention based network reentry or by M2M devices in common. The base station sends an AAI-PAG-ADV message containing the set one dedicated STID by broadcast [S310].

The base station transmits a specific IE masked with the set one dedicated STID to the M2M device or the M2M devices in a manner that information on an RA-ID list/set is contained in the specific IE [S320]. In the information on the RA-ID list/set, information on a dedicated ranging code and a ranging channel can be contained. In this case, the specific IE may correspond to a UL basic allocation A-MAP IE or a broadcast A-MAP IE. Moreover, it may be able to define a new IE that carries information on RA-ID list/set.

The M2M device selects a ranging channel, selects a ranging code, and then transmits the ranging code to the base station via the selected ranging channel [S330]. The base station transmits CDMA allocation A-MAP IE, which is UL resource allocation information for transmitting an AAI-RNG-REQ message, in a manner that the UL resource allocation information is CRC masked with AR-ID [S340]. The M2M device sends an AAI-RNG-REQ message to the base station via the allocated UL resource [S350]. The base station then transmits a DL resource allocation information for transmitting an AAI-RNG-RSP message to the M2M device [S360]. Thereafter, the M2M device may be able to receive an AAI-RNG-RSP message via the corresponding DL resource [S370].

Meanwhile, an M2M device in idle mode is awaked in its listening interval and then checks whether system information is changed (e.g., S-SFH change count in P-SFH). If the system information is changed, the corresponding M2M device may have to perform a procedure for acquiring latest system information.

Yet, the M2M device failing to have the latest system information may not be able to read a paging message transmitted in its listening interval.

Therefore, for the paging message reception, the corresponding M2M device should wait until a next paging cycle or a $2^{nd}$ paging offset in the same paging cycle. For example, the corresponding M2M device may wait while sleeping.

In doing so, if a user equipment has a long paging cycle, it may be cause a problem that a paging reception and response for the corresponding user equipment may have a long delay time.

Alternatively, if a user equipment has a long paging cycle, system information may be changed again while waiting despite that latest system information is acquired in the corresponding cycle.

Hence, unless uplink data is generated, it may cause such a problem that a procedure for monitoring a presence or non-presence of a change, updating system information and awaiting a reception of a paging message may be infinitely repeated, Moreover, regarding the S-SFH change cycle described with reference to Table 1, a count of system information changes may exceed a maximum change count applied to the S-SFH change cycle during a paging cycle greater than a prescribed value.

This situation may be represented as Formula 1.

$$I = C \times 2^n \qquad \text{[Formula 1]}$$

In Formula 1, 'I' is a reference cycle compared with a paging cycle, 'C' is a change cycle of a secondary superframe header, and 'n' indicates a bit size of a change count of the secondary superframe header.

Referring to Formula 1 and Table 1, a value of C may be set to one of 16, 32, 64 . . . . And, a value of n may be set to 4. In this case, during a paging cycle greater than the calculated I value, system information may be changed over a multiple of 16 times.

If there is a change of the system information, a field value indicating a presence or non-presence of the change of the system information may not be valid any more. In particular, although the field value is equal to a count of system information owned by a user equipment, a corresponding M2M device is not sure whether the system information is not changed, whether the system information has been changed 16 times, or the like. This may cause a problem as well.

Accordingly, the present invention provides a method of determining whether system information is updated by 2 steps.

Yet, the 2-step update method according to the present invention is just exemplary. And, it is apparent that system information may be updated by each step configuring the 2-step update method.

In the following description, a 2-step system information updating method according to the present invention is explained in detail.

First of all, a $1^{st}$ step is described as follows.

In the $1^{st}$ step, a user equipment examines a previous S-SFH change cycle duration.

Thus, in the $1^{st}$ step, a presence or non-presence of a change of a previous duration is checked and system information is updated. This is because system information of a previous change count may be applicable to a partial interval in n duration.

For clarity of the following description, an S-SFN change cycle duration, to which a listening interval of a user equipment in idle state belongs, is set to n and a reference value is set to M.

A value of M is previously defined and set or may be signaled by a base station. For instance, M is equal to or greater than 1.

In case of 'm=M' indicating a $1^{st}$ routine, a user equipment checks whether system information is changed at a start point (SFN modulo S-SFH change cycle=0) of S-SFH change cycle duration (n−m) in S-SFH change cycle duration (n) to which a listening interval of the user equipment in idle state belongs.

Yet, as mentioned in the foregoing description, regarding the S-SFH change cycle described with reference to Table 1, it may cause the same problem of the case that a count of system information changes may exceed a maximum change count applied to the S-SFH change cycle during a paging cycle greater than a prescribed value.

Hence, if a prescribed condition is satisfied, the user equipment may definitely perform a system information update irrespective of a presence or non-presence of a change. For instance, if the following condition is satisfied, the user equipment may be able to instantaneously perform the system information update. In particular, the user equipment should acquire all system informations (e.g., S-SFH SP1 IE, S-SFH SP 2 IE, and S-SFH SP3 IE all).

(1) Paging cycle (=256, 512, 32768, 262144, 4194304) equal to or greater than S-SFH change cycle=16, $16*2^4$ (=256)

(2) Paging cycle (=512, 32768, 262144, 4194304S) equal to or greater than SFH change cycle=32, $32*2^4$ (=512)

(3) Paging cycle (=32768, 262144, 4194304S) equal to or greater than SFH change cycle=64, $64*2^4$ (=1024)

Yet, the above-enumerated three conditions are examples based on Table 1 and Formula 1. Alternatively, it is apparent that other conditions may be provided in modified forms according to other references.

When the above condition is not satisfied, a system information update is performed only if system information is changed. Namely, the user equipment acquires the changed system information (e.g., at least one of S-SFH SP1 IE, S-SFH SP 2 IE and S-SFH SP 3 IE) only.

In doing so, if S-SFH change cycle is changed in the system information, the corresponding M2M device should perform the $1^{st}$ step by resetting a start point in consideration of the corresponding information.

If m is equal to or greater than 2, it may be able to decrement the m by 1. And, this routine may be repeated until the m becomes 1.

In particular, the M2M device in idle state checks whether system information is changed at a start point (SFN modulo S-SFH change cycle=0) of S-SFH change cycle duration (n−m) in S-SFH change cycle duration (n) to which its listening interval belongs. The M2M device then performs the system information update only if the system information is changed.

Yet, if S-SFH change cycle is changed in the system information, the corresponding M2M device should perform the $1^{st}$ step by resetting a start point in consideration of the corresponding information. In doing so, the m nay be decremented by 1.

Secondly, a $2^{nd}$ step is described as follows.

First of all, the $2^{nd}$ step is the step of examining S-SFH change cycle duration to which a listening interval of the user equipment belongs.

The reason why a presence or non-presence of a change of the corresponding duration is checked is because system information of a corresponding count in n duration may be applicable only after a partial interval.

In particular, the M2M device in idle state checks whether system information is changed at a start point (SFN modulo S-SFH change cycle=0) of S-SFH change cycle duration (n) to which its listening interval belongs.

Thereafter, the M2M device performs the system information update only if the system information is changed.

Moreover, in accordance with a system information apply field, it may be able to apply a system information having an appropriate change count value.

Figure 8:
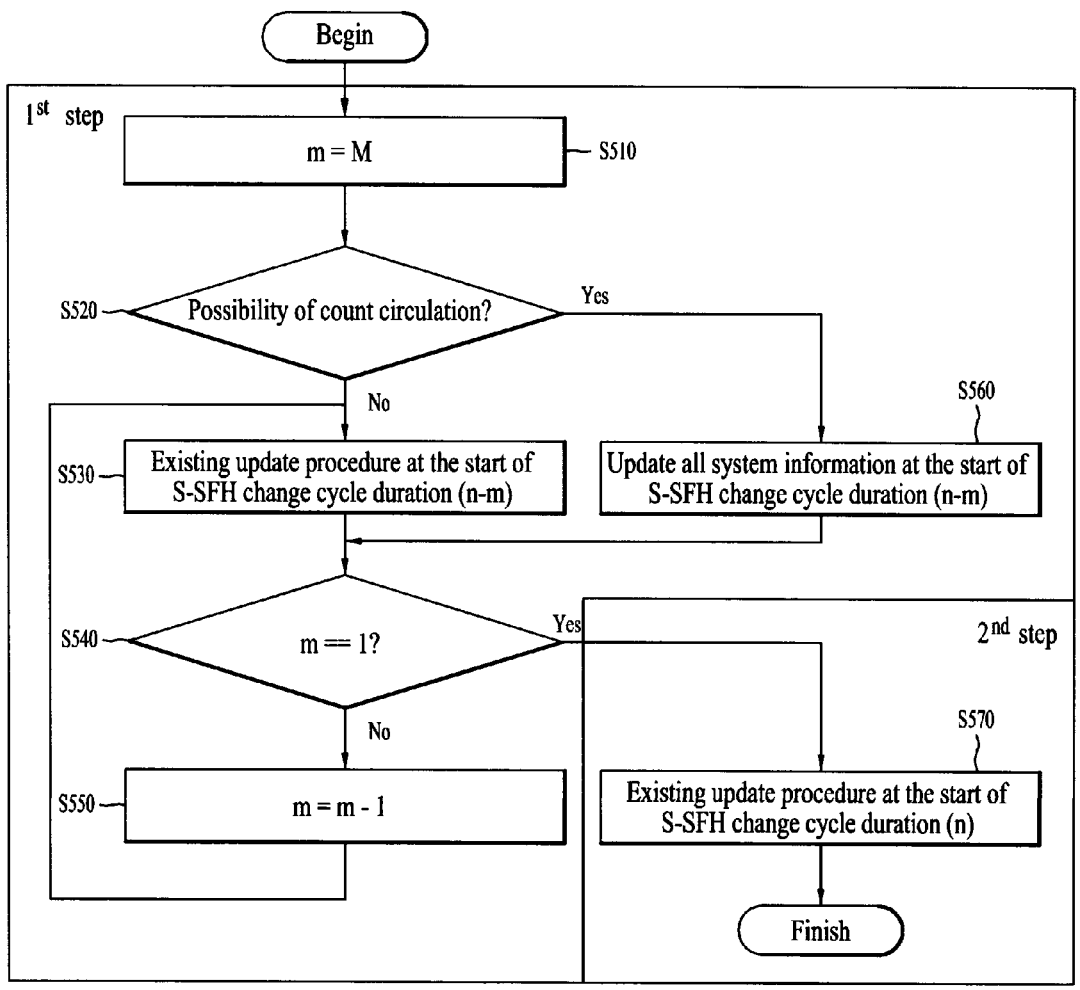
FIG. 8 is a flowchart for one example of updating system information through a plurality of steps according to one embodiment of the present invention.

FIG. 8 is a flowchart for one example of updating system information through a plurality of steps according to one embodiment of the present invention.

Referring to FIG. 8, first of all, a user equipment determines how far a start point of monitoring S-SFH change cycle duration, to which a listening interval of the user equipment in idle state belongs, will be set behind n [S510].

Subsequently, the user equipment determines whether an S-SFH change count value is valid [S520].

On such a condition as 'paging cycle (=256, 512, 32768, 262144, 4194304) equal to or greater than S-SFH change cycle=16, $16*2^4$ (=256)', 'paging cycle (=512, 32768, 262144, 4194304S) equal to or greater than SFH change cycle=32, $32*2^4$ (=512)', 'paging cycle (=32768, 262144, 4194304S) equal to or greater than SFH change cycle=64, $64*2^4$ (=1024)' and the like, the terminal may be able to definitely perform the system information update irrespective or a presence or non-presence of a change of the system information [S560].

If the above condition is not satisfied, the user equipment determines whether a changed information exists [S530]. If m is equal to or greater than 2, it may be able to decrement the m by 1. And, this routine may be repeated until the m becomes 1.

In particular, the M2M device in idle state checks whether system information is changed at a start point (SFN modulo S-SFH change cycle=0) of S-SFH change cycle duration (n−m) in S-SFH change cycle duration (n) to which its listening interval belongs.

The M2M device then performs the system information update only if the system information is changed.

Yet, if S-SFH change cycle is changed in the system information, the corresponding M2M device should perform the $1^{st}$ step by resetting a start point in consideration of the corresponding information.

Subsequently, the user equipment examines a current S-SFH change cycle duration.

In particular, the M2M device in idle state checks whether system information is changed at a start point (SFN modulo S-SFH change cycle=0) of S-SFH change cycle duration (n) to which its listening interval belongs.

Thereafter, the M2M device performs the system information update only if the system information is changed [S570].

Moreover, in accordance with a system information apply field, it may be able to apply a system information having an appropriate change count value.

Figure 9:
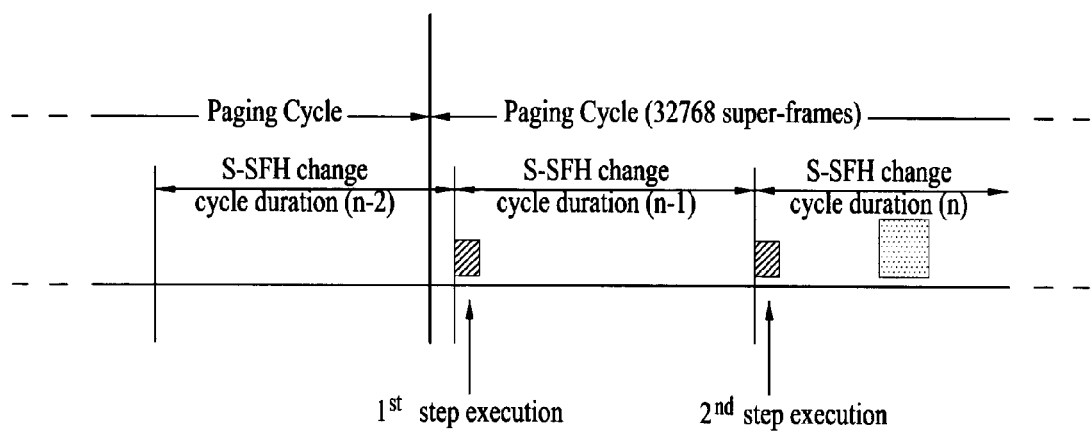
FIG. 9 is a diagram to illustrate one example of updating system information through a plurality of steps according to one embodiment of the present invention.

FIG. 9 is a diagram to illustrate one example of updating system information through a plurality of steps according to one embodiment of the present invention.

In particular, FIG. 9 shows the content of the present invention described with reference to FIG. 8 according to a flow of time.

Referring to FIG. 9, a user equipment monitors S-SFH change cycle duration, to which a listening interval of the user equipment in idle state belongs, from (n−1) with reference to n.

Referring to FIG. 9, on such a condition as 'paging cycle (=256, 512, 32768, 262144, 4194304) equal to or greater than S-SFH change cycle=16, $16*2^4$ (=256)', 'paging cycle (=512, 32768, 262144, 4194304S) equal to or greater than SFH change cycle=32, $32*2^4$ (=512)', 'paging cycle (=32768, 262144, 4194304S) equal to or greater than SFH change cycle=64, $64*2^4$ (=1024)' and the like, the terminal may be able to definitely perform the system information update irrespective or a presence or non-presence of a change of the system information.

If the above condition is not satisfied, the user equipment determines whether a changed information exists [S530]. If m is equal to or greater than 2, it may be able to decrement the m by 1. And, this routine may be repeated until the m becomes 1.

In particular, the M2M device in idle state checks whether system information is changed at a start point (SFN modulo S-SFH change cycle=0) of S-SFH change cycle duration (n−m) in S-SFH change cycle duration (n) to which its listening interval belongs.

The M2M device then performs the system information update only if the system information is changed.

Yet, if S-SFH change cycle is changed in the system information, the corresponding M2M device should perform the $1^{st}$ step by resetting a start point in consideration of the corresponding information.

Moreover, the user equipment performs the $2^{nd}$ step shown in FIG. 9 to examine a current S-SFH change cycle duration. In particular, the M2M device in idle state checks whether system information is changed at a start point (SFN modulo S-SFH change cycle=0) of S-SFH change cycle duration (n) to which its listening interval belongs.

Therefore, a plurality of the aforementioned problems are solved. And, the M2M device is advantageously able to update system information quickly without error occurrence.

Figure 10:
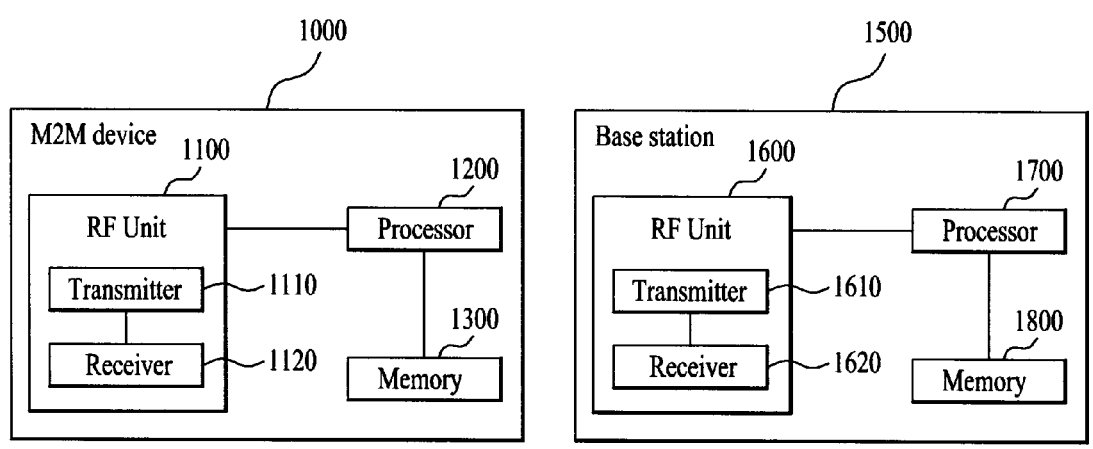
FIG. 10 is a block diagram for configuration of an M2M device and a base station according to one embodiment of the present invention.

FIG. 10 is a block diagram for configuration of an M2M device and a base station according to one embodiment of the present invention.

Referring to FIG. 10, an M2M device 1000 may include an RF unit 1100, a processor 1200 and a memory 1300. And, a base station 1500 may include an RF unit 1600, a processor 1700 and a memory 1800. The RF unit 110/160 may include a transmitter 1110/1610 and a receiver 1120/1620.

For example of the M2M device 1000, the transmitter 1110 is configured to transmit signals to the base station 1500 and other M2M devices. And, the receiver 1120 is configured to receive signals from the base station 1500 and other M2M devices. The process 1200 is functionally connected to each of the transmitter 1110 and the receiver 1120 to control a process for the transmitter 1110 and the receiver 1120 to transceive signals with other devices.

The processor 1200 performs various kinds of processings on a signal to transmit and then transfers the processed signal to the transmitter 1110. And, the processor 1200 may be able to perform processing on a signal received by the receiver 1120. If necessary, the processor 1200 may control information contained in an exchanged message to be saved in the memory 1300. The above-configured M2M device 1000 may perform various methods according to embodiments of the present invention mentioned in the foregoing description.

Besides, the M2M device 1000 may further include various kinds of additional components (not shown in FIG. 10) according to its machine application types. In case that the corresponding M2M device 1000 is provided for the smart meter, it may further include an additional configuration for power measurement and the like. This power measuring operation may be performed under the control of the processor 1200 shown in FIG. 10 or a separately configured processor (not shown in the drawing).

Although FIG. 10 shows a case that a communication is performed between the M2M device 1000 and the base station 1500, an M2M communication method according to the present invention may be performed between M2M devices.

Meanwhile, the transmitter 1610 of the base station 1500 is configured to transmit signals to another base station, an M2M server and M2M devices. And, the receiver 1620 of the base station 1500 is configured to receive signals from another base station, an M2M server and M2M devices. The process 1700 is functionally connected to each of the transmitter 1610 and the receiver 1620 to control a process for the transmitter 1610 and the receiver 1620 to transceive signals with other devices or user equipments.

The processor 1700 performs various kinds of processings on a signal to transmit and then transfers the processed signal to the transmitter 1610. And, the processor 1700 may be able to perform processing on a signal received by the receiver 1620. If necessary, the processor 1700 may control information contained in an exchanged message to be saved in the memory 1800. The above-configured base station 1500 may perform various methods according to embodiments of the present invention mentioned in the foregoing description.

The processor 1200 of the M2M device 1000 directs operations (e.g., control, adjustment, management, etc.) in the M2M device 1000. The processor 1700 of the base station 1500 directs operations (e.g., control, adjustment, management, etc.) in the base station 1500. The processor 1200/1700 may be connected to the memory 1300/1800 configured to store program codes and data.

The memory 1300/1800 is connected to the processor 1200/1700 to store operating systems, applications and general files.

The processor 1200/1700 may be named one of a controller, a microcontroller, a microprocessor, a microcomputer and the like. Moreover, the processor 1200/1700 may be implemented by hardware, firmware, software or a combination thereof. In case of implementing an embodiment of the present invention using hardware, the processor 120/170 may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing embodiments of the present invention using firmware or software, the firmware or software may be configured to include modules, procedures, and/or functions for performing the functions or operations of the present invention. And, the firmware or software configured to perform the present invention may be driven by the processor 1200/1700 in a manner of being installed at the processor 1200/1700 or being saved in the memory 1300/1800.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, a method for an M2M device to perform a network reentry may be applicable to such a wireless communication system as 3GPP LTE-A system, IEEE 802 system and the like.

What is claimed is:

1. A method of decoding superframe header subpacket information in an M2M (machine to machine) device in idle mode in a wireless communication system, comprising the steps of:
   comparing a paging cycle with a $1^{st}$ cycle; and
   if the paging cycle is equal to or greater than the $1^{st}$ cycle, decoding the superframe header subpacket information,
   wherein the $1^{st}$ cycle is determined using a following formula:

$$I = C \times 2^n,$$

where the I indicates the $1^{st}$ cycle, the C is a change cycle of a secondary superframe header, and the n is a bit size of a change count of the secondary superframe header.

2. The method of claim 1, wherein the change cycle of the secondary superframe header comprises one selected from the group consisting of 16, 32 and 64.

3. The method of claim 1, wherein the bit size of the change count of the secondary superframe header is 4.

4. The method of claim 1, further comprising the steps of:
   sending a $1^{st}$ message to a base station to make a request for the paging cycle; and
   receiving a $2^{nd}$ message containing the paging cycle in response to the sent $1^{st}$ message.

5. The method of claim 1, further comprising the steps of:
   if the paging cycle is smaller than the $1^{st}$ cycle, determining whether a system information is changed; and
   if the system information is changed, decoding the superframe header subpacket information.

6. The method of claim 5, wherein if the change cycle of the secondary superframe header is changed, the system information is determined as changed.

7. An M2M (machine to machine) device, which decodes superframe header subpacket information in idle mode in a wireless communication system, comprising:
   a processor comparing a paging cycle with a $1^{st}$ cycle, the processor, if the paging cycle is equal to or greater than the $1^{st}$ cycle, decoding the superframe header subpacket information, the processor controlling the $1^{st}$ cycle to be determined using a following formula:

$$I = C \times 2^n,$$

where the I indicates the $1^{st}$ cycle, the C is a change cycle of a secondary superframe header, and the n is a bit size of a change count of the secondary superframe header.

8. The M2M device of claim 7, wherein the change cycle of the secondary superframe header comprises one selected from the group consisting of 16, 32 and 64.

9. The M2M device of claim 7, wherein the bit size of the change count of the secondary superframe header is 4.

10. The M2M device of claim 7, further comprising:
    a transmitting module transmitting a $1^{st}$ message to a base station to make a request for the paging cycle; and
    a receiving module receiving a $2^{nd}$ message containing the paging cycle in response to the sent $1^{st}$ message.

11. The M2M device of claim 7, wherein if the paging cycle is smaller than the $1^{st}$ cycle, the processor determines whether a system information is changed and wherein if the system information is changed, the processor controls the superframe header subpacket information to be decoded.

12. The M2M device of claim 11, wherein if the change cycle of the secondary superframe header is changed, the processor determines that the system information is changed.

* * * * *